United States Patent
Ando et al.

(10) Patent No.: US 8,705,138 B2
(45) Date of Patent: Apr. 22, 2014

(54) IMAGE FORMING APPARATUS INCLUDING AN IMAGE CALIBRATION SYSTEM

(75) Inventors: Hideki Ando, Kanagawa (JP); Katsuhisa Ono, Tokyo (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 13/078,451

(22) Filed: Apr. 1, 2011

(65) Prior Publication Data

US 2011/0261413 A1 Oct. 27, 2011

(30) Foreign Application Priority Data

Apr. 23, 2010 (JP) ................................ 2010-099490

(51) Int. Cl.
*H04N 1/407* (2006.01)
*B41J 2/00* (2006.01)
(52) U.S. Cl.
USPC ........................................ 358/3.26; 347/188
(58) Field of Classification Search
USPC ........ 358/504, 496, 498, 520, 3.26, 519, 503, 358/1.5; 347/179, 188, 191
See application file for complete search history.

(56) References Cited

U.S. PATENT DOCUMENTS

| 6,774,922 B2 * | 8/2004 | Kaerts et al. .................. 347/183 |
| 2007/0177229 A1 * | 8/2007 | Cessel et al. .................. 358/504 |
| 2010/0128099 A1 * | 5/2010 | Evans ........................... 347/171 |

FOREIGN PATENT DOCUMENTS

| JP | 2000-22954 | 1/2000 |
| JP | 2000-326537 | 11/2000 |
| JP | 2002-204371 | 7/2002 |
| JP | 2007-259123 | 10/2007 |

* cited by examiner

*Primary Examiner* — Barbara Reinier
(74) *Attorney, Agent, or Firm* — Oblon, Spivak, McClelland, Maier & Neustadt, L.L.P.

(57) ABSTRACT

There is provided an image forming apparatus including a print head adapted to form an image on a recording medium, a transport path for the recording medium, the transport path being provided on at least one of a feed side and a discharge side of the recording medium with respect to the print head, an image reading device provided on the transport path, the image reading device being adapted to read an image formed by the print head, a correction chart provided opposite the image reading device with the transport path interposed in between, the correction chart being read by the image reading device in order to correct a reading result of the image reading device, based on information obtained from reading the correction chart, and a distance adjustment device adapted to increase or decrease the distance between the correction chart and the image reading device.

9 Claims, 8 Drawing Sheets

IMAGE FORMING APPARATUS INCLUDING AN IMAGE CALIBRATION SYSTEM

BACKGROUND OF THE INVENTION

1. Field of the Invention

The present invention relates to an image forming apparatus having an image reading device for correcting the density and color balance of an image to be formed on a recording medium.

2. Description of the Related Art

Conventionally, image forming apparatuses that use a variety of methods for forming an image on a recording medium on the basis of image data have been known.

However, such conventional image forming apparatuses, with any of the variety of methods, are not always able to provide the same printing results even when their driving conditions (e.g., driving voltage and driving time) are set to predetermined values. Specifically, dye-sublimation thermal printers may slightly vary in their printing characteristics depending on ribbon cartridges or roll paper cartridges being used, which would adversely affect the printing results. Further, the printing characteristics may also vary depending on the temperature or humidity when a ribbon cartridge or the like is stored or when printing is performed.

In order to suppress the aforementioned changes or variations in the printing characteristics and realize printing with stable image quality, the driving conditions in printing should be corrected in accordance with the printing conditions. To this end, there is disclosed a technique of printing test patterns in such a manner as to combine a plurality of patches whose color shades slightly differ from one another, on a gray background, visually judging the test patterns, and selecting a patch whose color is the closest to the background gray color. Then, correction is performed on the basis of the color components of the selected patch, whereby image quality is stabilized (see JP 2000-022954A).

There is also disclosed a technique of printing a test pattern with a halftone gray value, and measuring the amount of light reflected from the printed image using a photosensor, which is arranged downstream of a transport path of a recording medium, to determine the print density. Then, correction is performed on the basis of the difference between the determination result of the print density and print image data, whereby image quality is stabilized. Further, with this technique, it is possible to use, when measuring the amount of light reflected, a portion on which no test pattern is printed as a reference white (see JP 2000-326537A).

As described above, although there exists a technique of performing correction by reading a test pattern with a photosensor or the like, such a technique would also involve calibration of the photosensor. In the field of scanners, there is known a technique of providing a scanner calibration mode, reading a calibration sheet, which has been prepared in advance, with a scanner, and performing correction on the basis of the difference between the value of the image data on the calibration sheet and the reading result. With this technique, it is possible to correct shading, which results from luminance unevenness of a light source, by reading a white reference belt provided on the end of platen glass (see JP 2007-259123A).

Further, there is also known a technique of providing, in calibration of a color image scanner, a reference plate, which has a white region and a color patch region, in a region outside the document reading range. Such a technique performs calibration by reading the reference plate (see JP 2002-204371A).

SUMMARY OF THE INVENTION

Although the technique disclosed in JP 2000-022954A is able to correct the color balance, it has a configuration in which a patch that appears to be visually optimal is selected from among a plurality of printed patches. Therefore, such correction would be merely relative correction. Further, as variations may occur depending on persons whose select a patch, accurate correction cannot be said to be always possible.

The technique disclosed in JP 2000-326537A performs correction by measuring the print density of a test pattern with a photosensor that is provided downstream of a transport path. Thus, unlike the technique of JP 2000-022954A, the correction process can be executed automatically. Further, as a white portion of a recording medium with no printing thereon can be used for a test pattern, which in turn allows calibration of the photosensor, more accurate correction is possible.

However, since the white colors of recording media differ from one recording medium to another, and such a white portion is not always ideal white, it is conceivable that accurate correction may not be possible.

According to the technique of JP 2007-259123A, calibration of an image scanner is possible without using a white portion of a recording medium.

However, since a calibration sheet with a calibration pattern formed thereon should be prepared in advance, this technique would involve cumbersome management of the calibration sheet and the like. Further, when such a calibration sheet is used for a printer, a mechanism would be required that takes in a calibration sheet from outside of the printer, transports the sheet to the scanner reading position, causes the scanner to read the sheet, and transports the sheet for discharge. This could result in increased cost, size and complexity.

In contrast with the technique of JP 2007-259123A, the technique of JP 2002-204371A does not require a calibration sheet as a pattern to be used as a calibration reference (a reference plate) is provided in a region outside the document reading range of the scanner.

However, even when one attempts to apply the technique of JP 2002-204371A to a printer, the resulting printer cannot have the same configuration as that of the image scanner of JP 2002-204371A. Specifically, since a printer is configured to perform printing while transporting a recording medium, it follows that a scanner for correcting the driving conditions in printing is fixedly arranged on a transport path. Therefore, such a configuration is contrary to the configuration in which a reference plate, which is arranged outside the document reading range, is read by moving a scanner.

In light of the foregoing, it is desirable to provide an image forming apparatus such as a printer that is capable of providing stable image quality by accurately correcting the driving conditions in forming an image while also avoiding an increase in the cost, size, and complexity of the apparatus.

According to an embodiment of the present invention, there is provided an image forming apparatus including a print head adapted to form an image on a recording medium, a transport path for the recording medium, the transport path being provided on at least one of a feed side and a discharge side of the recording medium with respect to the print head, an image reading device provided on the transport path, the image reading device being adapted to read an image formed by the print head, a correction chart provided opposite the image reading device with the transport path interposed in between, the correction chart being read by the image reading device in order to correct a reading result of the image reading device, based on information obtained from reading the correction chart, and a distance adjustment device adapted to increase or decrease the distance between the correction chart and the image reading device.

(Working Effect)

The image forming apparatus according to the aforementioned embodiment of the present invention includes an image reading device provided on a transport path, a correction chart provided opposite the image reading device with the transport path interposed therebetween, and a distance adjustment device adapted to increase or decrease the distance between the correction chart and the image reading device. Therefore, correction of the image reading device based on the correction chart is possible by moving the correction chart closer to the image reading device with the distance adjustment device. Meanwhile, transport of a recording medium (image formation) would not be interrupted if the correction chart is moved away from the image reading device with the distance adjustment device.

According to the present invention, an image reading device and a correction chart are provided on a transport path of a recording medium. Therefore, a dedicated mechanism for taking in the correction chart from outside of the image formation apparatus would not be required.

DETAILED DESCRIPTION OF THE EMBODIMENTS

Figure 1:
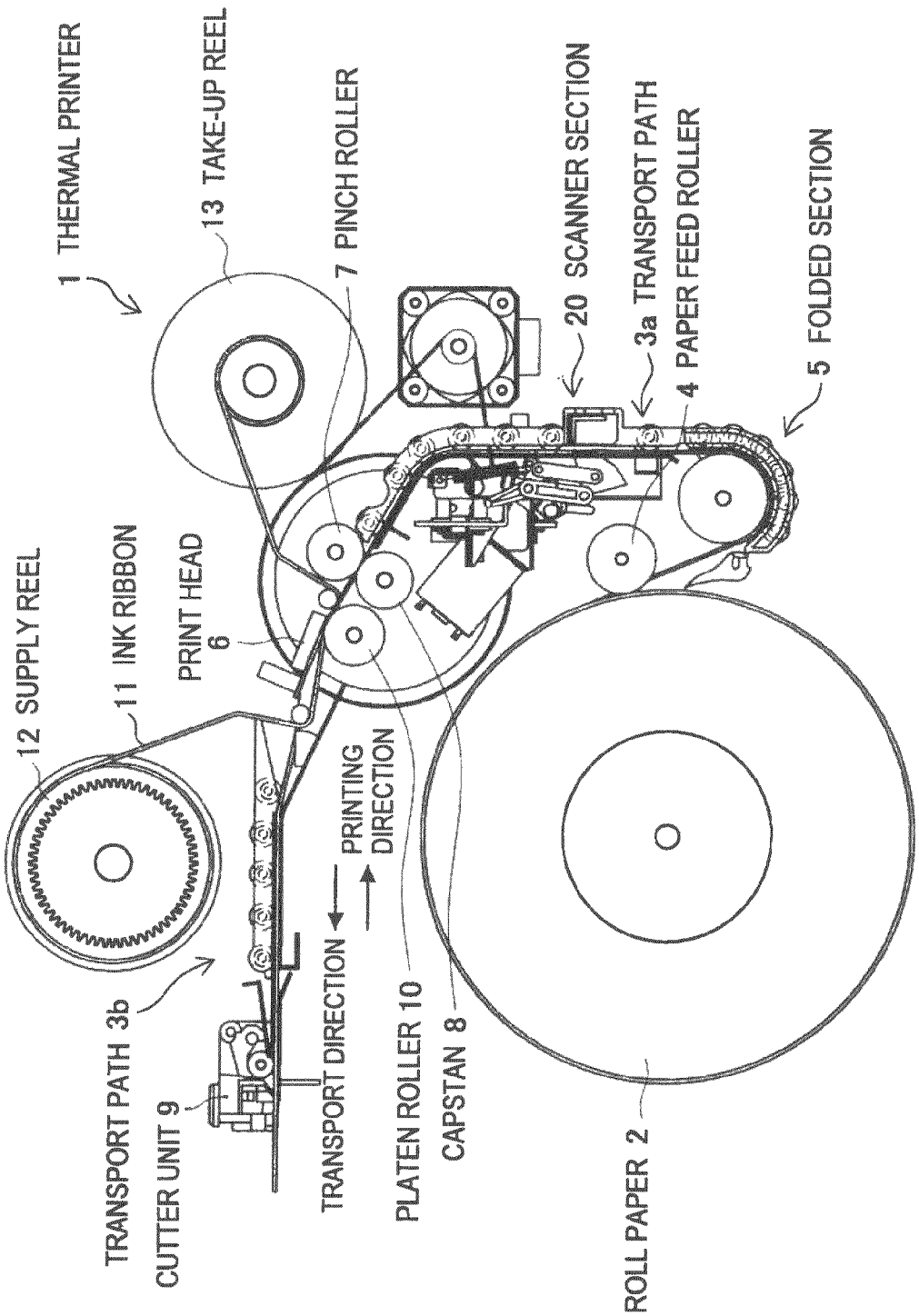
FIG. 1 is a side view showing the internal structure of a thermal printer in accordance with one embodiment of the image forming apparatus of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In the following embodiment, the image forming apparatus in accordance with the present invention is a dye-sublimation thermal printer 1.

[Exemplary Structure of the Image Forming Apparatus]

FIG. 1 is a side view showing the internal structure of the thermal printer 1 in accordance with one embodiment of the image forming apparatus of the present invention.

The thermal printer 1 causes a sublimation dye applied to an ink ribbon 11 to sublime with the use of heat energy that is generated when heat-generating elements in a print head 6 (which corresponds to the print head of the present invention) are turned on. Then, the dye is transferred onto roll paper 2 (which corresponds to the recording medium of the present invention) so that an image is formed thereon.

Herein, the roll paper 2 is wound around a roll paper cartridge in the shape of a roll, and is set in a roll-paper loading section in the thermal printer 1. Then, the roll paper 2 is taken out of the roll-paper loading section as needed, and is transported. Specifically, the roll paper 2 is unreeled by a paper feed roller 4 on a transport path 3a that is provided on the feed side of the roll paper 2 with respect to the print head 6. Then, the roll paper 2 is sent to the print head 6 through a folded section 5.

This folded section 5 is an approximately U-shaped path, and is configured to change the direction of the roll paper 2, which has just entered, for discharge. With the incorporation of such a folded section 5, it is possible to effectively utilize a limited space in the thermal printer 1. Further, as the loading inlet and the discharge outlet of the roll paper 2 can be arranged to face the same direction (the front side of the thermal printer 1), the operability of the thermal printer 1 can also be improved.

A pinch roller (a driven roller) 7 and a capstan (a driving roller) 8 perform paper feeding during the operation of changing the direction of the roll paper 2 at the folded section 5, printing onto the roll paper 2 fed to the print head 6, and discharging the paper. Specifically, the roll paper 2 is sandwiched between the pinch roller 7 and the capstan 8, and is sent forward in the transport direction with the forward-rotation drive of the capstan 8. Accordingly, the roll paper 2 is transported through a path between the print head 6 and a platen roller 10, and then toward a cutter unit 9. Conversely, when the capstan 8 is driven to rotate in reverse, the roll paper 2 is sent backward in the printing direction.

It should be noted that the capstan 8 is driven in synchronism with the paper feed roller 4, and forward/reverse rotations of the capstan 8 are precisely controlled.

In addition to the roll paper 2, the ink ribbon 11 also passes through the path between the print head 6 and the platen roller 10. The ink ribbon 11 is coated with color inks, which are respectively colored in yellow (Y), magenta (M), and cyan (C), and also with a transparent laminate ink (L). The ink ribbon 11 is stored in a ribbon cartridge, and is taken out of a supply reel 12 of the ribbon cartridge in accordance with gray scale data that has been subjected to a color conversion process. Further, the ink ribbon 11 is guided by guide rollers arranged on opposite sides of the print head 6, so that the ink ribbon 11 passes above the platen roller 10 and the roll paper 2 in the printing position, and is sequentially sent toward a take-up reel 13.

In printing, the capstan 8 is driven to rotate forward while the print head 6 is lifted to a standby position away from the platen roller 10. Then, the end (print end point) of the roll paper 2 passes below the print head 6, and the roll paper 2 is sent forward in the transport direction until the print start point thereof is positioned above the platen roller 10. Thereafter, the print head 6 in the standby position is lowered into pressure contact with the platen roller 10, sandwiching therebetween the roll paper 2 as well as the ink ribbon 11.

In such a state, the capstan 8 is driven to rotate in reverse, and the ink ribbon 11 is taken up with the take-up reel 13. Accordingly, the ink ribbon 11 is taken up while the roll paper 2 sandwiched between the print head 6 and the platen roller 10 is sent backward in the printing direction from the print start point to the print end point. In this period, gray scale data is input to the print head 6, and the heat-generating elements (e.g., heating resistors) are selectively turned on to generate heat energy. Consequently, the yellow (Y) ink (a first ink) of the ink ribbon 11 sublimes and is transferred onto the roll paper 2.

As described above, the thermal printer 1 in this embodiment is adapted to form an image while returning the roll paper 2 to the feed side thereof. After the yellow (Y) ink is transferred by the initial printing operation, the thermal printer 1 prepares for the transfer of the next magenta (M) ink. Specifically, when color printing is to be performed, the yellow (Y), magenta (M), and cyan (C) inks are individually transferred. Therefore, each time a single color ink is transferred, the print head 6 that has been sandwiching the ink ribbon 11 and the roll paper 2 with the platen roller 10 is lifted to return to the standby position, whereby the pressure contact of the print head 6 is released. Thereafter, the capstan 8 is driven to rotate forward, and the roll paper 2 is sent forward in the transport direction until the print start point thereof is positioned above the platen roller 10.

Next, a second magenta (M) ink is transferred in the same way as the transfer of the yellow (Y) ink. Specifically, the print head 6 is lowered so that the ink ribbon 11 and the roll paper 2 are sandwiched between the print head 6 and the platen roller 10. Then, the capstan 8 is driven to rotate in reverse, and the magenta (M) ink of the ink ribbon 11 is transferred while the roll paper 2 is sent backward in the printing direction from the print start point to the print end point. After the magenta (M) ink is transferred, a third cyan (C) ink is transferred in the same way. Further, in order to protect the image formed by each color ink (Y, M, C) against ultraviolet light or the like and improve the light resistance, the laminate ink (L) is finally transferred.

After the last laminate ink (L) is transferred, the printed roll paper 2 with a color image formed thereon is discharged. Specifically, after the pressure contact of the print head 6 is released, the capstan 8 is driven to rotate forward, so that the roll paper 2 is sent forward in the transport direction. Accordingly, the roll paper 2 is guided to a transport path 3b that is provided on the discharge side of the roll paper 2 with respect to the print head 6, so that the print end point is positioned above the cutter unit 9. Then, the roll paper 2 is cut into a predetermined size, and is discharged from the paper discharge outlet.

As described above, the thermal printer 1 is configured to perform printing by causing the sublimation dye applied to the ink ribbon 11 to sublime with the use of heat energy that is generated when the heat-generating elements in the print head 6 are turned on, thereby transferring the sublimed dye onto the roll paper 2.

However, the printing characteristics may vary depending on the roll paper 2 or the ink ribbon 11 being used, and may also vary depending on the temperature or humidity when the roll paper or the ink ribbon is stored or when printing is performed. Therefore, in order to suppress such changes or variations in the printing characteristics and realize printing with stable image quality, the thermal printer 1 in this embodiment has a scanner section 20 for correcting the driving conditions in printing.

Figure 2:
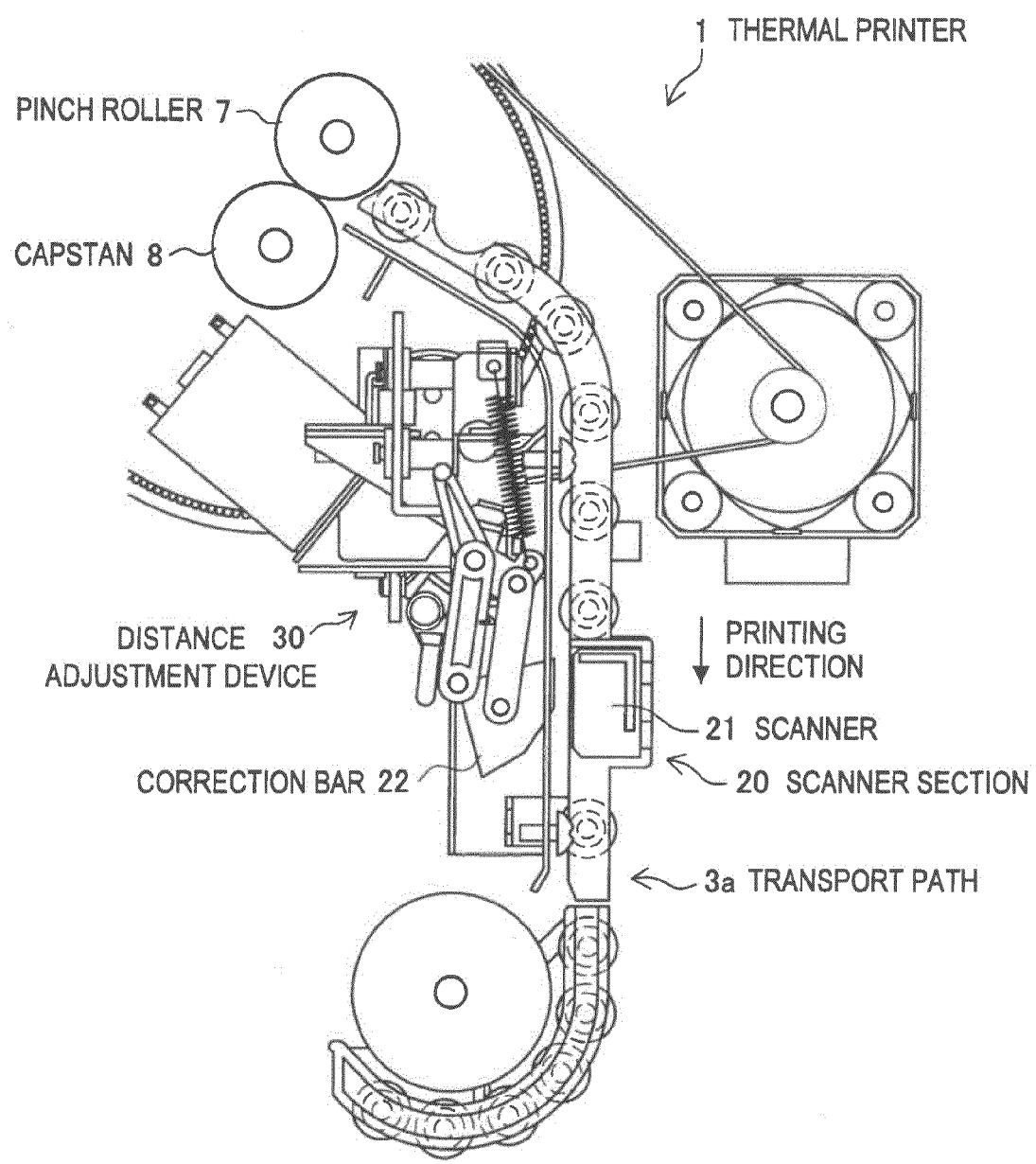
FIG. 2 is a side view showing a scanner section in the thermal printer shown in FIG. 1.

FIG. 2 is a side view showing the scanner section 20 in the thermal printer 1 shown in FIG. 1. As shown in FIG. 2, the scanner section 20 is provided on the transport path 3a, and has a scanner 21 (which corresponds to the image reading device of the present invention) for correcting the density and color balance of an image formed by the print head 6 (see FIG. 1). In addition, a correction bar 22 is provided so as to be opposite the scanner 21. Further, a distance adjustment device 30 for increasing or decreasing the distance between the correction bar 22 and the scanner 21 is also provided.

Herein, the scanner 21 reads an image to correct the density and color balance of the image. Examples of the scanning methods include a CCD method in which light from an image is guided to a CCD (Charge Coupled Device) image sensor that is an imaging device, and a CIS (Contact Image Sensor) method in which light from an image is directly guided to a CMOS (Complementary Metal Oxide Semiconductor) image sensor. The scanner 21 is configured such that its CCD or CMOS image sensor is fixed on the transport path 3a in such a way that there is a predetermined distance between the CCD or CMOS image sensor and the roll paper 2 (see FIG. 1).

The thermal printer 1 in this embodiment performs printing while sending the roll paper 2 (see FIG. 1) backward in the printing direction by driving the capstan 8 to rotate in reverse. The scanner 21 is arranged on the transport path 3a on the feed side of the roll paper 2, at a position where the scanner 21 can read, during formation of an image by the print head 6 (see FIG. 1), the image that has just been formed. Therefore, it is possible to eliminate the need to, in calibration of the actual printing result on the roll paper 2, return the roll paper 2 back to the scanner 21. In other words, calibration of the printing result can be performed within a sequence of printing.

The correction bar 22 is provided opposite the scanner 21 with the transport path 3a interposed therebetween in order to correct the reading result of the scanner 21. The distance between the correction bar 22 and the scanner 21 is adapted to be increased or decreased by the distance adjustment device 30 so that the roll paper 2 (see FIG. 1) can be fed on the transport path 3a without any interruption. Specifically, when correction is performed to the scanner 21, the correction bar 22 is moved closer to the scanner 21 by the distance adjustment device 30.

Meanwhile, when the roll paper 2 is fed or when the scanner 21 calibrates the printing result (reads a formed image), the correction bar 22 is moved away from the scanner 21 by the distance adjustment device 30, whereby a space for transporting the roll paper 2 is secured.

Figure 3:
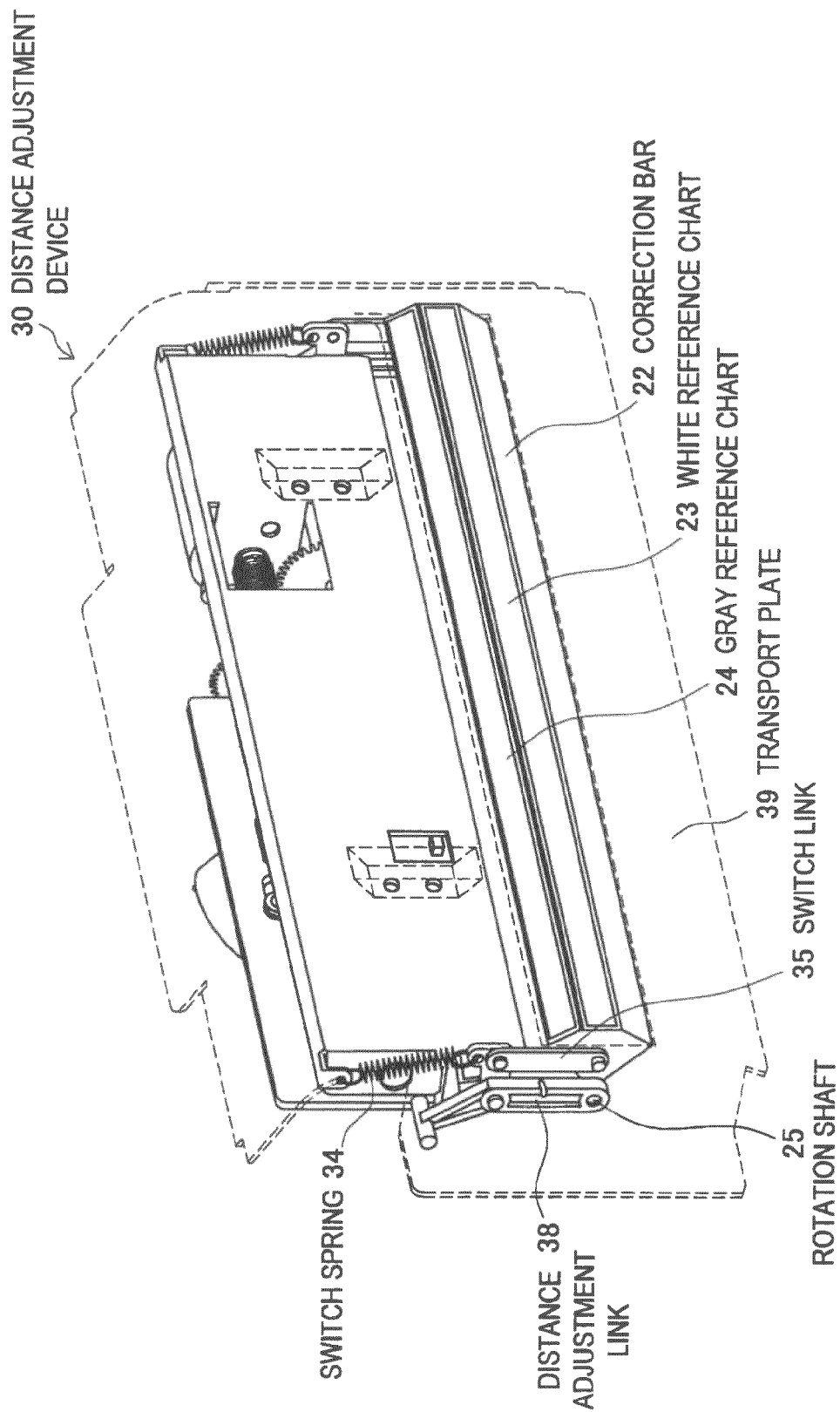
FIG. 3 is a front view showing a correction bar and a distance adjustment device shown in FIG. 2.

FIG. 3 is a front view showing the correction bar 22 and the distance adjustment device 30 shown in FIG. 2.

Figure 4:
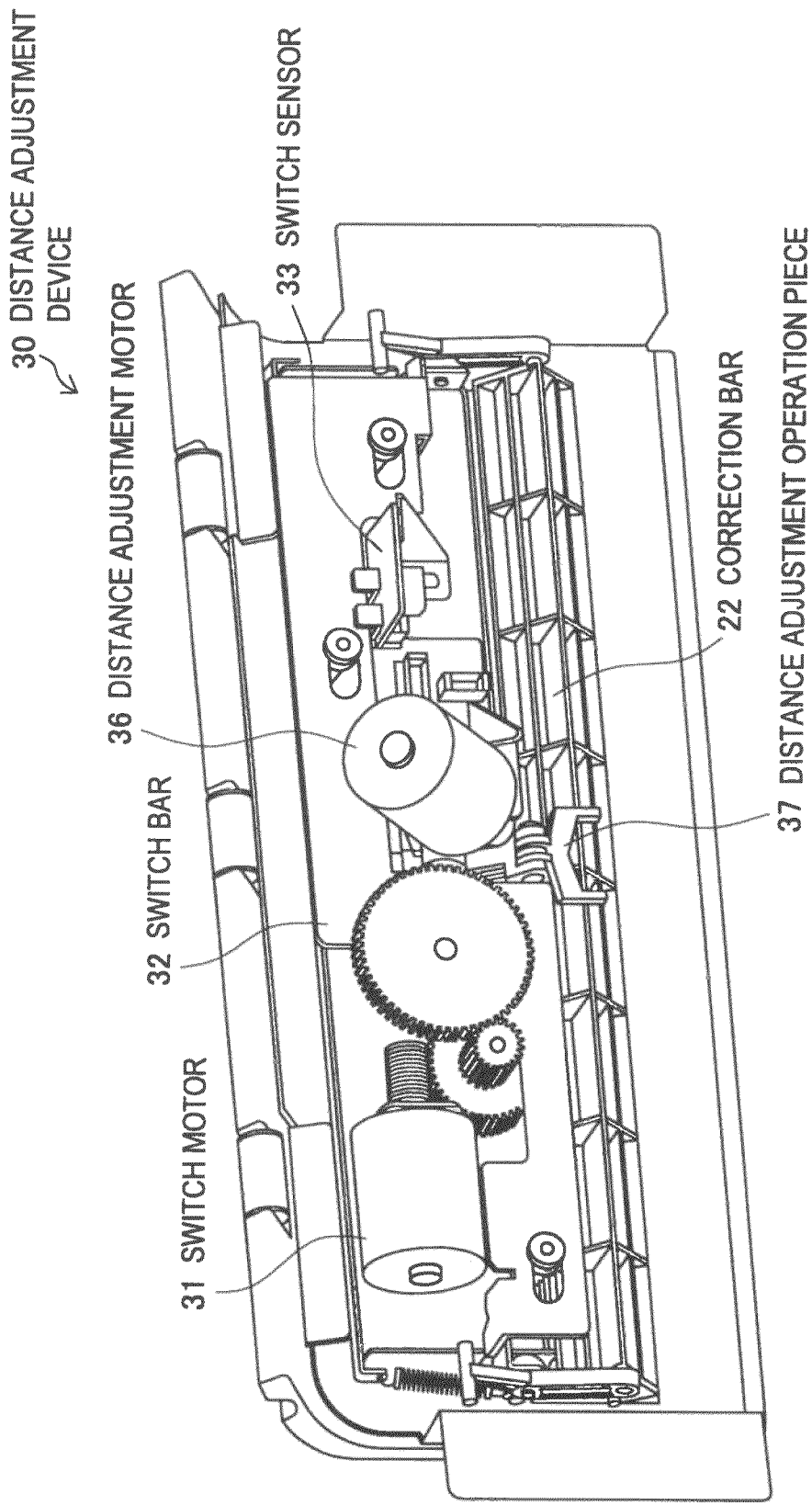
FIG. 4 is a rear view showing the correction bar and the distance adjustment device shown in FIG. 2.

FIG. 4 is a rear view showing the correction bar 22 and the distance adjustment device 30 shown in FIG. 2.

As shown in FIG. 3, the correction bar 22 is equipped with a white reference chart 23 and a gray reference chart 24 as the correction charts for correcting the reading result of the scanner 21 (see FIG. 2). With the two correction charts, correction of the scanner 21 is possible.

The distance between the correction bar 22 and the scanner 21 (see FIG. 2) is increased or decreased by the distance adjustment device 30 (see FIG. 2), and this distance adjustment device 30 has a built-in switch device adapted to switch between the correction charts. This switch device includes a switch motor 31, a switch bar 32, and a switch sensor 33 that are shown in FIG. 4, and a switch spring 34 and a switch link 35 that are shown in FIG. 3. In the initial state shown in FIG. 3, the switch link 35 is pulled upward by the force of the switch spring 34, so that the white reference chart 23 is positioned opposite the scanner 21 (see FIG. 2).

Herein, if the correction chart is switched from the white reference chart 23 to the gray reference chart 24, the switch motor 31 shown in FIG. 4 is driven. Accordingly, the switch bar 32 moves to pull the switch link 35 downward against the force of the switch spring 34. Consequently, the correction bar 22 rotates downward about its rotation shaft 25 as the center, whereby the gray reference chart 24 is positioned opposite the scanner 21 (see FIG. 2).

It should be noted that the switching state of such correction charts is detected by the switch sensor 33 (see FIG. 4).

The distance adjustment device 30 also includes a distance adjustment motor 36 and a distance adjustment operation piece 37 that are shown in FIG. 4, and a distance adjustment link 38 shown in FIG. 3. In the initial state shown in FIG. 3, a transport plate 39, which constitutes part of the transport path 3a (see FIG. 2), and the correction bar 22 (the white reference chart 23) are positioned substantially on the same plane. Therefore, the roll paper 2 (see FIG. 1) can be fed on the transport plate 39 without any interruption.

In order to move the correction bar 22 (the white reference chart 23) closer to the scanner 21 (see FIG. 2) from such a state, the distance adjustment motor 36 shown in FIG. 4 is driven. Accordingly, the distance adjustment operation piece 37 is actuated to push the correction bar 22 out. In this case, the correction bar 22 is supported by a four-bar link with the switch link 35 and the distance adjustment link 38 as shown in FIG. 3. Therefore, the white reference chart 23 is pushed out while maintaining a state parallel with the surface of the transport plate 39, and is thus positioned closer to and opposite the scanner 21. Consequently, correction of the scanner 21 (reading of the white reference chart 23) becomes possible.

Figure 5:
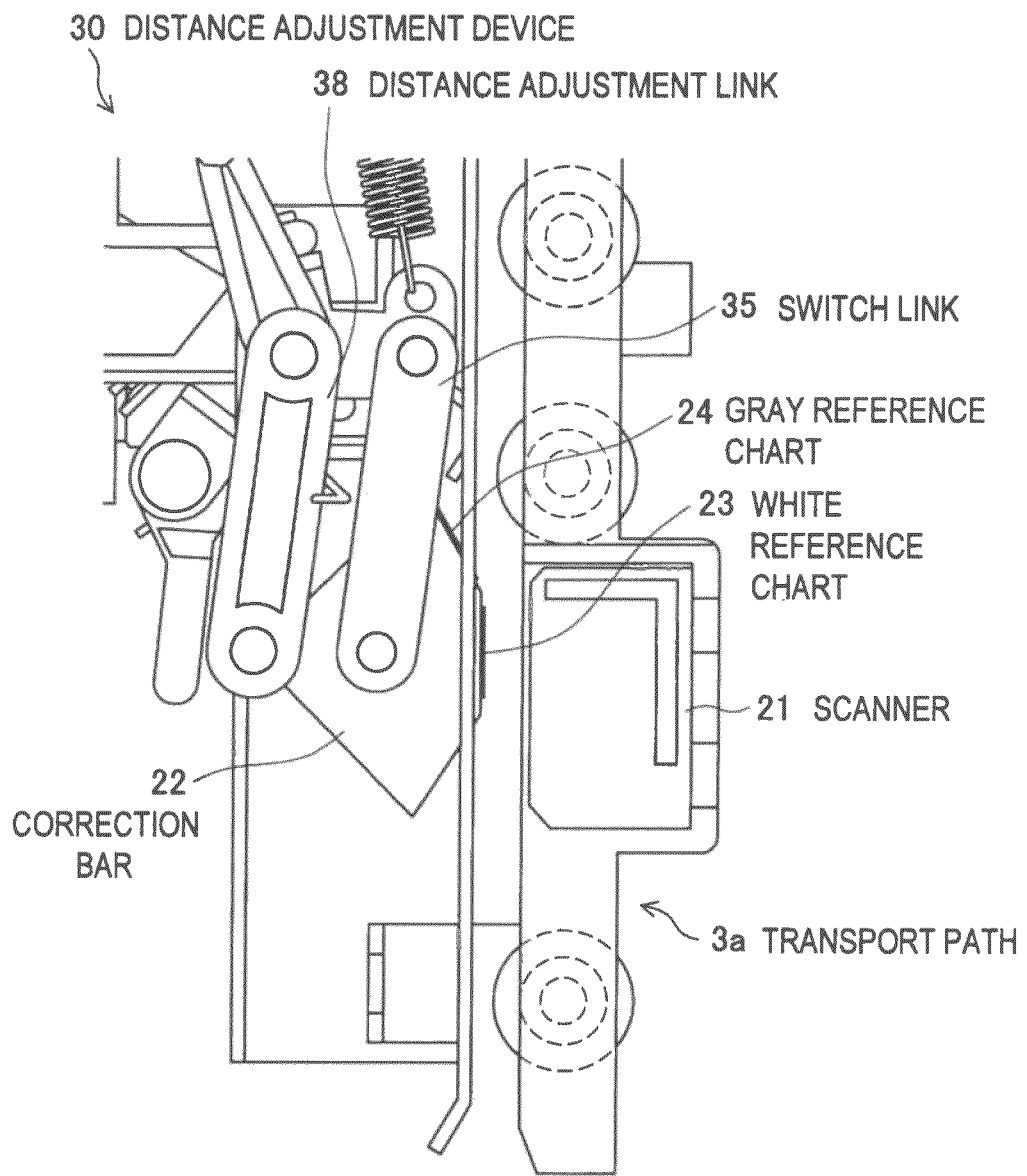
FIG. 5 is a side view showing a first stage of correction of the scanner in the thermal printer shown in FIG. 1.

FIG. 5 is a side view showing a first stage of correction of the scanner 21 in the thermal printer 1 shown in FIG. 1.

Figure 6:
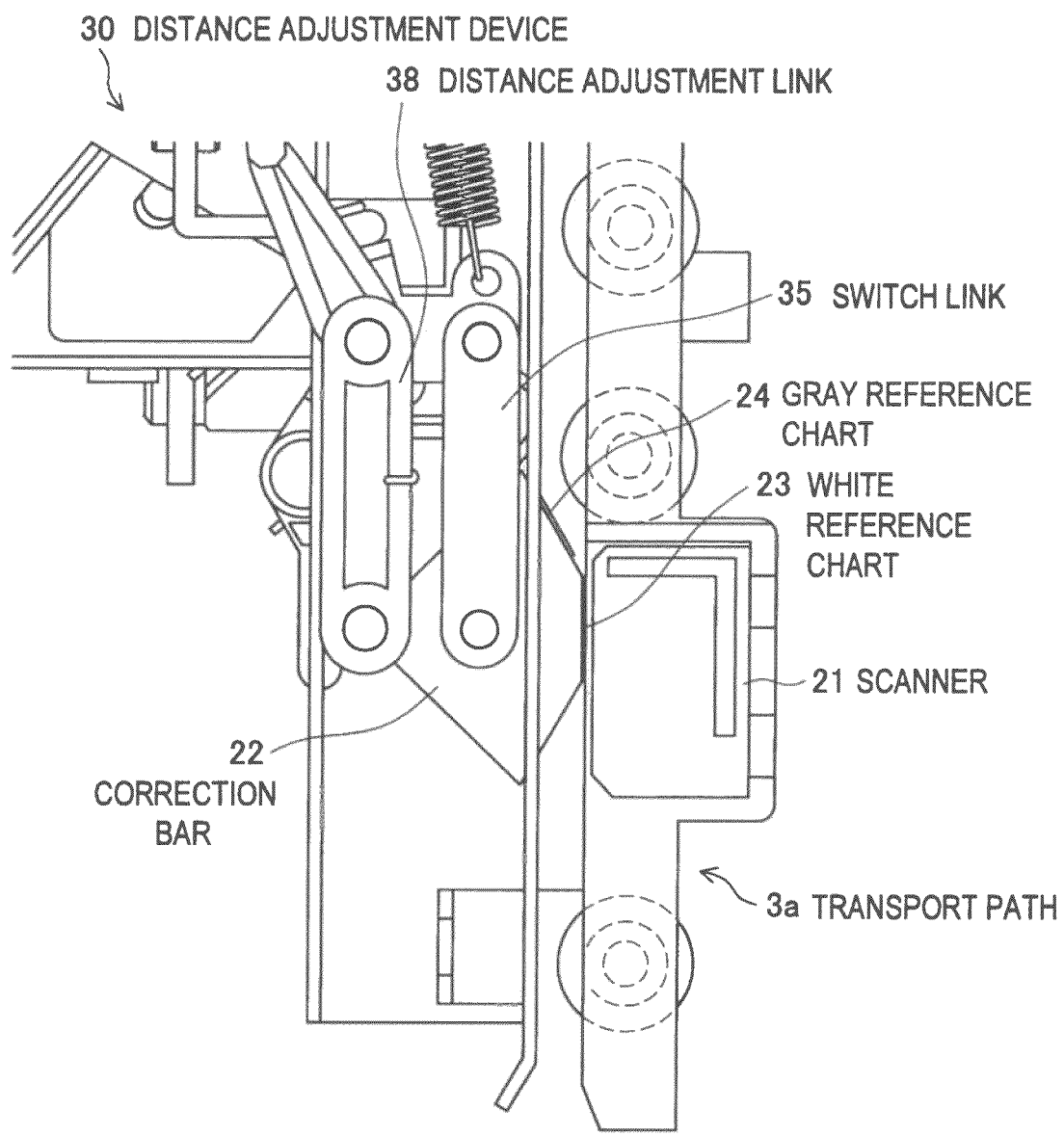
FIG. 6 is a side view showing a second stage of correction of the scanner in the thermal printer shown in FIG. 1.

FIG. 6 is a side view showing a second stage of correction of the scanner 21 in the thermal printer 1 shown in FIG. 1.

Figure 7:
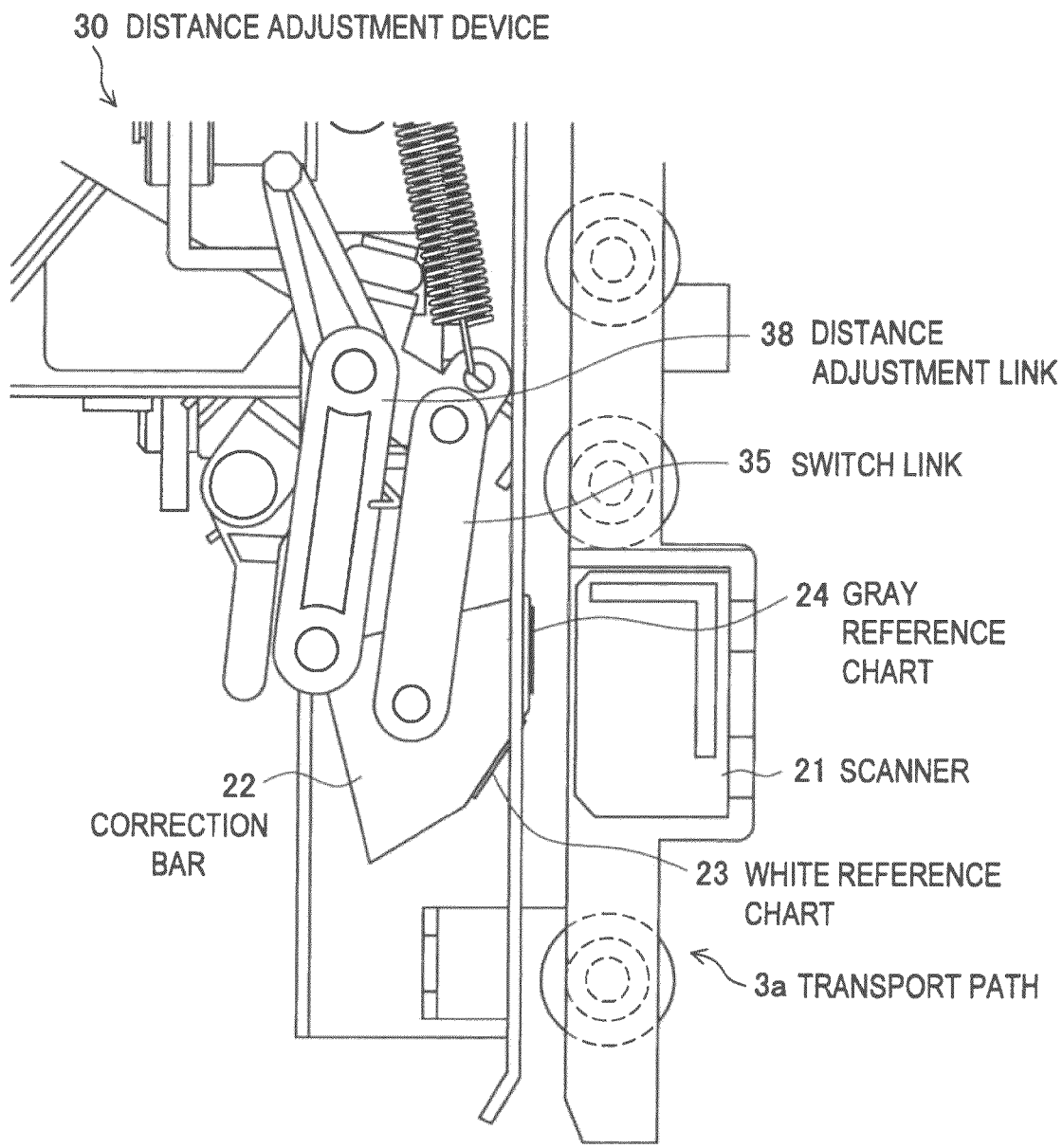
FIG. 7 is a side view showing a third stage of correction of the scanner in the thermal printer shown in FIG. 1.

FIG. 7 is a side view showing a third stage of correction of the scanner 21 in the thermal printer 1 shown in FIG. 1.

Figure 8:
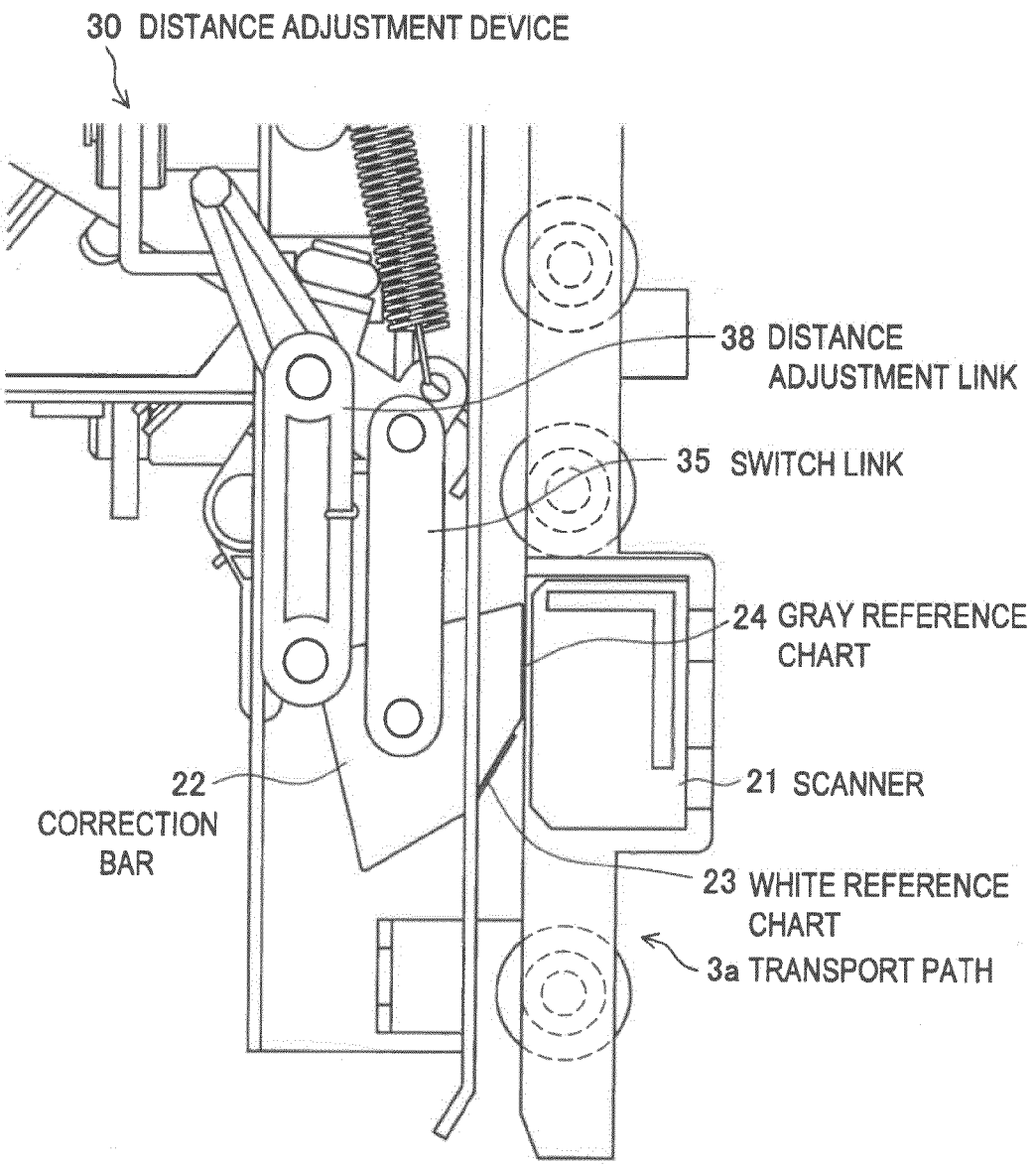
FIG. 8 is a side view showing a fourth stage of correction of the scanner in the thermal printer shown in FIG. 1.

FIG. 8 is a side view showing a fourth stage of correction of the scanner 21 in the thermal printer 1 shown in FIG. 1.

When the scanner 21 is to be corrected (calibrated), correction is performed first using the white reference chart 23 of the correction bar 22. Therefore, the correction bar 22 is rotated by driving the built-in switch motor 31 of the distance adjustment device 30 (see FIG. 4), whereby the white reference chart 23 is positioned opposite the scanner 21 as in the first stage of correction shown in FIG. 5.

Next, the distance adjustment motor 36 of the distance adjustment device 30 (see FIG. 4) is driven to cause the distance adjustment link 38 to rotate counterclockwise. Then, the correction bar 22 is moved toward the scanner 21 so that the white reference chart 23 is made closer to the scanner 21 and thus abuts the reading plane of the scanner 21 as in the second stage of correction shown in FIG. 6.

It should be noted that the correction bar 22 is moved while the distance adjustment link 38 and the switch link 35 maintain a parallel state between the white reference chart 23 and the scanner 21.

Herein, the scanner 21 is caused to read the white reference chart 23. This white reference chart 23 is prepared to correct a phenomenon that data read by the scanner 21 varies even though an image with uniform density has been read (shading correction). Therefore, shading correction is performed in the second stage of correction shown in FIG. 6.

Upon termination of the aforementioned shading correction, the distance adjustment motor 36 of the distance adjustment device 30 (see FIG. 4) is driven again. This time, the distance adjustment link 38 is rotated clockwise so that the correction bar 22 is moved away from the scanner 21 (returned to the state shown in FIG. 5). Accordingly, the correction chart can be switched from the white reference chart 23 to the gray reference chart 24. Specifically, the switch motor 31 of the distance adjustment device 30 (see FIG. 4) is driven to lower the switch link 35. Consequently, the correction bar 22 rotates clockwise so that the gray reference chart 24 is positioned opposite the scanner 21 as in the third stage of correction shown in FIG. 7.

As described above, the correction chart is switched to the gray reference chart 24 and the distance adjustment motor 36 of the distance adjustment device 30 (see FIG. 4) is driven again. Then, the distance adjustment link 38 is rotated counterclockwise to move the correction bar 22, so that the gray reference chart 24 is brought closer to the scanner 21. Accordingly, the gray reference chart 24 abuts the reading plane of the scanner 21 as in the fourth stage of correction shown in FIG. 8.

This gray reference chart 24 is prepared to correct the luminance gray scale of the scanner 21. Therefore, in the fourth stage of correction shown in FIG. 8, the gray reference chart 24 is read by the scanner 21. Then, the luminance gray scale is corrected on the basis of the luminance information obtained.

Finally, the distance adjustment motor 36 of the distance adjustment device 30 (see FIG. 4) is driven to move the correction bar 22 away from the scanner 21 (return it to the state shown in FIG. 7). Accordingly, a series of corrections of the scanner 21 terminates.

Alternatively, the series of corrections of the scanner 21 can be terminated upon returning the state shown in FIG. 7 (the standby state of the gray reference chart 24) to the state shown in FIG. 5 (the standby state of the white reference chart 23).

In the state shown in FIG. 5 or FIG. 7, the roll paper 2 (see FIG. 1) can freely move through the transport path 3a between the scanner 21 and the correction bar 22. Therefore, image formation on the roll paper 2 is performed in the state shown in FIG. 5 or FIG. 7.

When calibration of the printing result is performed, the state shown in FIG. 5 or FIG. 7 is changed to that shown in FIG. 6 or FIG. 8. Specifically, when the roll paper 2 is positioned on the transport path 3a that is opposite the scanner 21, the roll paper 2 with printing thereon is made into contact with the scanner 21 by changing the state to that shown in FIG. 6 or FIG. 8. Then, the scanner 21 reads the printing result on the roll paper 2, thereby correcting the density or color balance of the printed image.

As described above, the thermal printer 1 in this embodiment has the scanner 21 and the correction bar 22 (the white reference chart 23 and the gray reference chart 24) on the transport path 3a. Therefore, it is possible to avoid an increase in the size, complexity, and cost of the thermal printer 1. Further, as calibration can be automatically performed in the thermal printer 1 within a sequence of printing, there is no need for a user's dedicated operation, but still stable calibration is possible.

It should be understood by those skilled in the art that various modifications, combinations, sub-combinations and alterations may occur depending on design requirements and other factors insofar as they are within the scope of the appended claims or the equivalents thereof.

Although the embodiment of the present invention has been described above, the present invention is not limited thereto, and various modifications such as those described below are possible. For example:

(1) Although the aforementioned embodiment has described an example in which the dye-sublimation thermal printer 1 for forming an image on the roll paper 2 is used, the present invention is not limited thereto and can be applied to ink-jet printers or printers that use cut sheets. In addition to printers, the present invention can also be applied to copying machines, facsimile machines, and the like.

(2) Although the aforementioned embodiment has described an example in which the white reference chart 23 and the gray reference chart 24 are used as the correction charts, the present invention is not limited to calibration that uses white or gray as a reference. For example, it is possible to use a white patch, a black patch, a halftone gray patch, a colorless patch, a color patch, and the like for the correction charts. Such correction charts can be used either alone or in combination of two or more. In addition, using a plurality of correction charts can increase the calibration accuracy. Further, the calibration timing is desirably determined as appropriate according to the test results and the like.

The present application contains subject matter related to that disclosed in Japanese Priority Patent Application JP 2010-099490 filed with the Japan Patent Office on Apr. 23, 2010, the entire content of which is hereby incorporated by reference.

What is claimed is:

1. An image forming apparatus comprising:
   a print head adapted to form an image on a recording medium;
   a transport path for the recording medium, the transport path being provided on at least one of a feed side and a discharge side of the recording medium with respect to the print head;
   an image reading device provided on the transport path, the image reading device being adapted to read an image formed by the print head;
   a correction chart provided opposite the image reading device with the transport path interposed in between, the correction chart being read by the image reading device in order to correct a reading result of the image reading device based on information obtained from reading the correction chart; and
   a distance adjustment device adapted to increase or decrease a distance between the correction chart and the image reading device in a direction perpendicular to the transport path.

2. The image forming apparatus according to claim 1, wherein
   the correction chart includes a plurality of types of correction charts, and
   the image forming apparatus further comprises a switch device adapted to switch between the correction charts so that one of the correction charts is positioned opposite the image reading device.

3. The image forming apparatus according to claim 1, wherein
   the correction chart includes a combination of two or more of a white patch, a black patch, a halftone gray patch, a colorless patch, and a color patch, and
   the image forming apparatus further comprises a switch device adapted to switch between the correction charts so that one of the correction charts is positioned opposite the image reading device.

4. The image forming apparatus according to claim 1, wherein the image reading device is arranged at a position where the image reading device is able to read, during formation of an image by the print head, the image that has just been formed.

5. The image forming apparatus according to claim 1, wherein
   the print head is provided such that the print head forms an image while returning the recording medium to the feed side thereof, and
   the image reading device is arranged at a position where the image reading device is able to read, during formation of an image by the print head, the image that has just been formed, the position being on the feed side of the recording medium.

6. The image forming apparatus according to claim 1, wherein the distance adjustment device further comprises:
   a distance adjustment motor; and
   a distance adjustment operation piece that is actuated by the distance adjustment motor to move the correction chart.

7. The image forming apparatus according to claim 6, wherein the distance adjustment device further comprises:
   a four-bar link supporting the correction chart wherein two bars of the four-bar link support opposite sides of the correction chart.

8. The image forming apparatus according to claim 7, wherein the four-bar link further comprises:
   a distance adjustment link adapted to increase or decrease a distance between the correction chart and the image reading device.

9. The image forming apparatus according to claim 7, wherein the four-bar link further comprises:
   a switch link adapted to rotate the correction chart to expose a second correction chart to the image reading device.

* * * * *